US010054720B2

(12) United States Patent
Block et al.

(10) Patent No.: US 10,054,720 B2
(45) Date of Patent: Aug. 21, 2018

(54) FRESNEL LENS BARRIER RINGS (71) Applicant: Apple Inc., Cupertino, CA (US)

(72) Inventors: Ueyn L. Block, Menlo Park, CA (US); Tobias J. Harrison-Noonan, San Francisco, CA (US); David Nazzaro, Groveland, MA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 14/754,557

(22) Filed: Jun. 29, 2015

(65) Prior Publication Data
US 2016/0223720 A1  Aug. 4, 2016

Related U.S. Application Data (60) Provisional application No. 62/110,979, filed on Feb. 2, 2015.

(51) Int. Cl.
G02B 3/08   (2006.01)
G02B 5/18   (2006.01)

(52) U.S. Cl.
CPC ............. G02B 3/08 (2013.01); G02B 5/1876 (2013.01)

(58) Field of Classification Search
CPC ......... G02B 3/08; G02B 5/1876; G02B 5/188
USPC ................. 359/573, 574, 575, 742
See application file for complete search history.

(56) References Cited

U.S. PATENT DOCUMENTS

| 4,082,433 A * | 4/1978 | Appeldorn | G02B 3/08 359/601 |
| 5,138,495 A | 8/1992 | Shiono et al. | |
| 5,373,519 A * | 12/1994 | Siono | G02B 5/1861 359/572 |
| 5,483,261 A | 1/1996 | Yasutake | |
| 5,488,204 A | 1/1996 | Mead et al. | |
| 5,561,558 A * | 10/1996 | Shiono | G02B 5/1876 359/565 |
| 5,742,433 A * | 4/1998 | Shiono | G02B 5/1876 359/574 |
| 5,825,352 A | 10/1998 | Bisset et al. | |
| 5,835,079 A | 11/1998 | Shieh | |
| 5,880,411 A | 3/1999 | Gillespie et al. | |

(Continued)

FOREIGN PATENT DOCUMENTS

| JP | H01282501 A | 11/1989 |
| JP | 2000-163031 A | 6/2000 |

(Continued)

OTHER PUBLICATIONS

English machine translation of JP 2003322705 A.*

(Continued)

Primary Examiner — Nicholas R Pasko
(74) Attorney, Agent, or Firm — Morrison & Foerster LLP (57) ABSTRACT A Fresnel lens can be adhered to a window in an optical apparatus by liquid optically clear adhesive (LOCA). However, during adhesion the LOCA may spill over into grooves of the Fresnel lens, and the grooves can carry the LOCA into an active area of the lens potentially causing visual artifacts and altering the functional and cosmetic optical qualities of the lens. In examples of the disclosure, one or more grooves along the circumference of a surface of the lens surrounding inner grooves of the Fresnel lens can form a barrier ring that prevents the LOCA from reaching the inner grooves.

16 Claims, 7 Drawing Sheets

(56) References Cited

U.S. PATENT DOCUMENTS

| | | | |
|---|---|---|---|
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,409,141 B1 * | 6/2002 | Yamazaki | G01N 15/14 249/117 |
| 6,654,172 B2 * | 11/2003 | Pond | B60Q 1/2607 359/619 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,483,220 B2 * | 1/2009 | Kittelmann | F21L 4/005 359/742 |
| 7,663,607 B2 | 2/2010 | Hotelling et al. | |
| 8,210,677 B2 * | 7/2012 | Fermigier | G02B 3/08 351/159.45 |
| 8,479,122 B2 | 7/2013 | Hotelling et al. | |
| 2006/0197753 A1 | 9/2006 | Hotelling | |
| 2011/0310619 A1 * | 12/2011 | Sassoon | F21V 5/04 362/311.02 |

FOREIGN PATENT DOCUMENTS

| | | | |
|---|---|---|---|
| JP | 2002-342033 A | | 11/2002 |
| JP | 2003-322705 A | | 11/2003 |
| JP | 2003322705 A | * | 11/2003 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

FRESNEL LENS BARRIER RINGS

CROSS-REFERENCE TO RELATED APPLICATIONS

This application is the non-provisional application of U.S. Patent Application No. 62/110,979, filed Feb. 2, 2015, which is incorporated by reference in its entirety for all purposes.

FIELD OF THE DISCLOSURE

The present disclosure relates generally to lenses such as Fresnel lenses.

BACKGROUND OF THE DISCLOSURE

A Fresnel lens can be adhered to a window in an optical apparatus by liquid optically clear adhesive (LOCA). However, during adhesion the LOCA may spill over into grooves of the Fresnel lens, and the grooves can carry the LOCA into an active area of the lens potentially causing visual artifacts and altering the functional and cosmetic optical qualities of the lens.

SUMMARY OF THE DISCLOSURE

In examples of the disclosure, one or more grooves along the circumference of a surface of the lens surrounding inner grooves of the Fresnel lens can form a barrier ring that prevents the LOCA from reaching the inner grooves. The lens can include a first set of one or more grooves in the surface that are not concentric with the circumference of the surface, and a second set of one or more grooves in the surface that are concentric with the circumference of the surface and that surround the first set of grooves, forming a barrier ring.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A Fresnel lens can be adhered to a window in an optical apparatus by liquid optically clear adhesive (LOCA). However, during adhesion the LOCA may spill over into grooves of the Fresnel lens, and the grooves can carry the LOCA into an active area of the lens potentially causing visual artifacts and altering the functional and cosmetic optical qualities of the lens. In examples of the disclosure, one or more grooves along the circumference of a surface of the lens surrounding inner grooves of the Fresnel lens can form a barrier ring that prevents the LOCA from reaching the inner grooves.

Although examples described herein refer to a Fresnel lens, the examples are not so limited and apply more generally to any lenses including one or more grooves. Further, although some examples described herein illustrate a barrier ring including multiple grooves, the examples are not so limited and apply more generally to a barrier ring including only a single groove. Further, although some examples described herein illustrate continuous grooves, the examples are not so limited and apply more generally to lenses with multiple continuous grooves along a single curve.

Figure 1A:
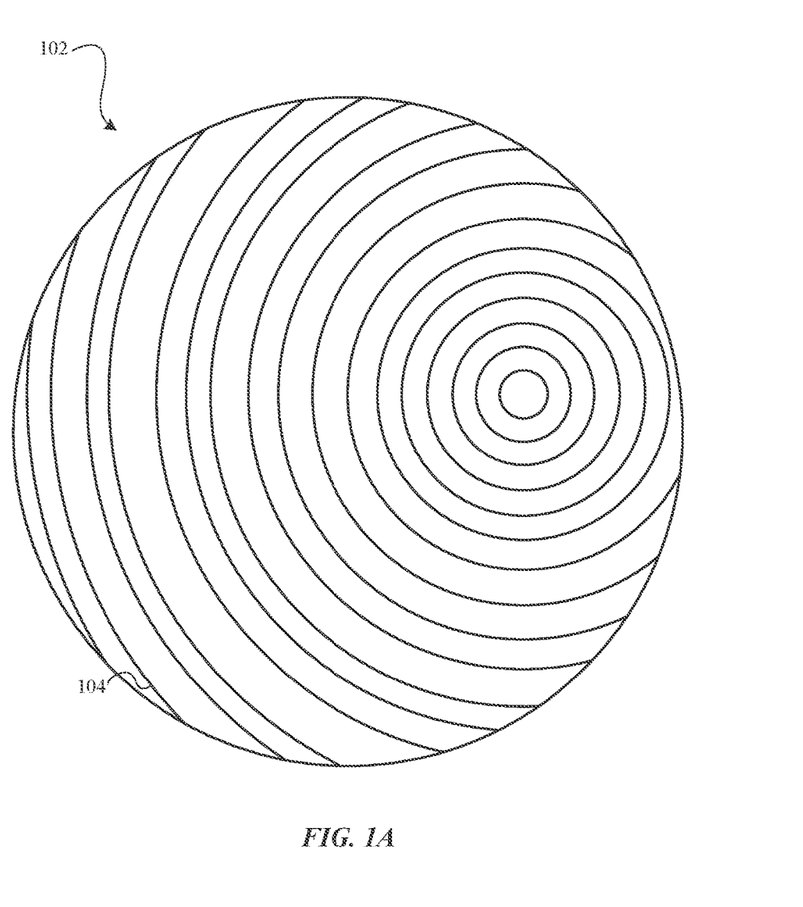
FIG. 1A illustrates a top view of a Fresnel lens having grooves that are not concentric with a circumference of a surface of the lens, according to embodiments of the disclosure.
Figure 1B:
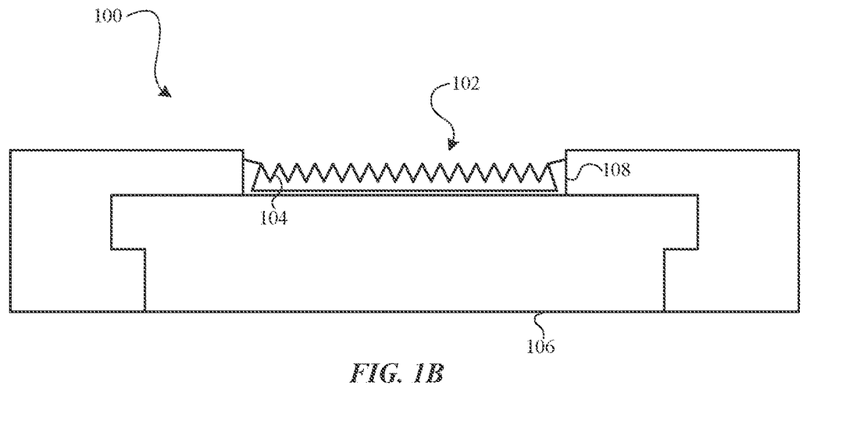
FIG. 1B illustrates a side view of a Fresnel lens adhered to a window using liquid optically clear adhesive, according to embodiments of the disclosure.

FIG. 1A illustrates a top view of a Fresnel lens 102 having a plurality of grooves 104 that are not concentric with a circumference of a surface of the lens. FIG. 1B illustrates a side view of a Fresnel lens 102 adhered to a window 106 using liquid optically clear adhesive (LOCA) 108 and situated in an optical apparatus 100. The lens 102 may include the plurality of grooves 104 on a surface of the lens that can act to collimate light that passes through the lens, among other optical qualities inherent in Fresnel lenses.

As illustrated in FIG. 1B, an opposite surface of the lens may be adhered to the window 106. During adhesion, the LOCA can move up around the sides of the lens, potentially spilling into the grooves 104. Because the lens 102 has grooves 104 that are not concentric with the circumference of the lens (e.g., the grooves are in a circular pattern with a center different from the center of the circumference of the lens), some of the grooves both intersect the circumference and pass through the center of the lens. If LOCA spills into the grooves 104 near the circumference of the lens 102, the LOCA can wick along these grooves to the center of the lens, potentially causing visual artifacts and altering the functional and cosmetic optical qualities of the lens.

Figure 2:
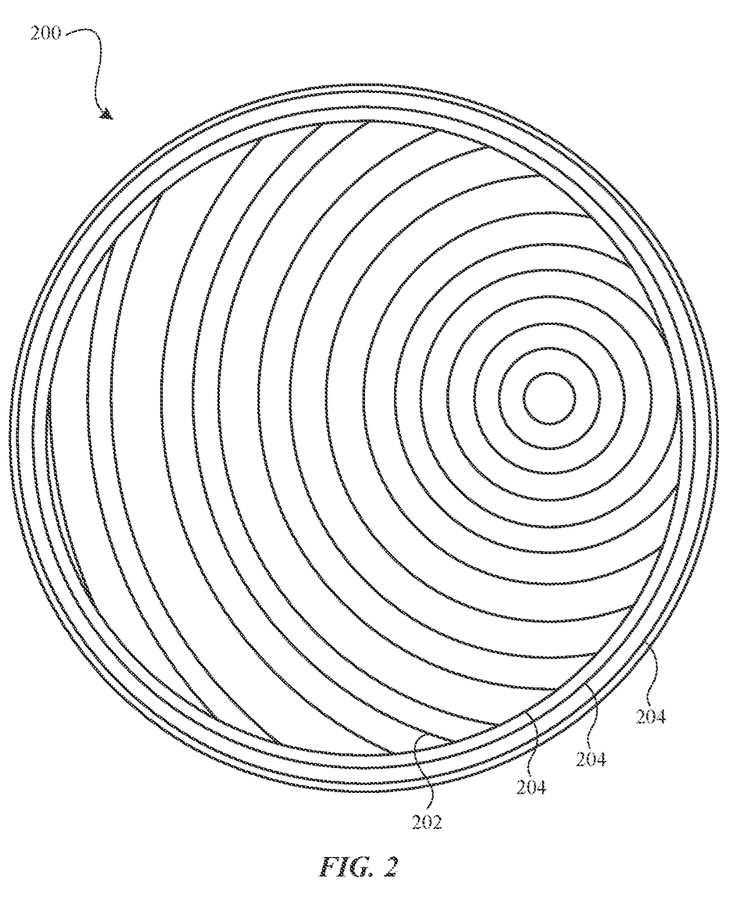
FIG. 2 illustrates a top view of a Fresnel lens including a first set of grooves that are not concentric with a circumference of a surface of the lens and a second set of grooves that form a barrier ring along the circumference, according to embodiments of the disclosure.

FIG. 2 illustrates a top view of a Fresnel lens 200 including a barrier ring to prevent LOCA from reaching inner grooves of the Fresnel lens. Similar to the lens 102 in FIGS. 1A and 1B, the lens 200 in FIG. 2 can include a first set of grooves 202 that are not concentric with the circumference of the surface of the lens (e.g., the grooves of the first set are in a circular pattern with a center different from the center of the circumference of the surface). However, the lens 200 can further include a second set of grooves 204 in the surface that are concentric with the circumference of the surface (e.g., the grooves of the second set are in a circular pattern with a center the same as the center of the circumference of the surface). Further, the second set of grooves 204 can surround the first set of grooves 202, thereby forming a barrier ring between the circumference of the surface and the first set of grooves to prevent LOCA from entering the first set of grooves.

For example, the lens 200 may be adhered, on an additional surface of the lens opposite the surface that includes the first and second sets of grooves, to a window, similar to the optical apparatus illustrated in FIG. 1B. During adhesion, excess liquid adhesive can move around the edges of the lens 200 and onto the surface of the lens including the first and second sets of grooves. The second set of grooves 204 can act as a barrier, containing any excess adhesive before it can reach the first set of grooves 202. Accordingly, after adhesion the liquid adhesive may be present in at least an outermost groove of the second set of grooves 204. However, because the second set of grooves 204 are concentric with the circumference and proximate to the circumference, any LOCA in the second set will remain at the edges of the lens 200 and away from the center of the lens.

In some examples, the grooves of the second set define an annular portion of the surface surrounding the first set of grooves. Although the second set of grooves 204 are concentric with a circumference of the lens 200 in FIG. 2, examples are not so limited. For example, the grooves of the second set can spiral inwards and still form a barrier ring surrounding the first set of grooves. In some examples, the grooves of the second set can be offset with respect to the circumference of the lens such that the grooves of the second set are non-concentric but still form a barrier ring surrounding the first set of grooves. In some examples, the grooves of the second set can form a wavy, jagged, or other non-circular path along an annular portion of the surface surrounding the first set of grooves.

Figure 3A:
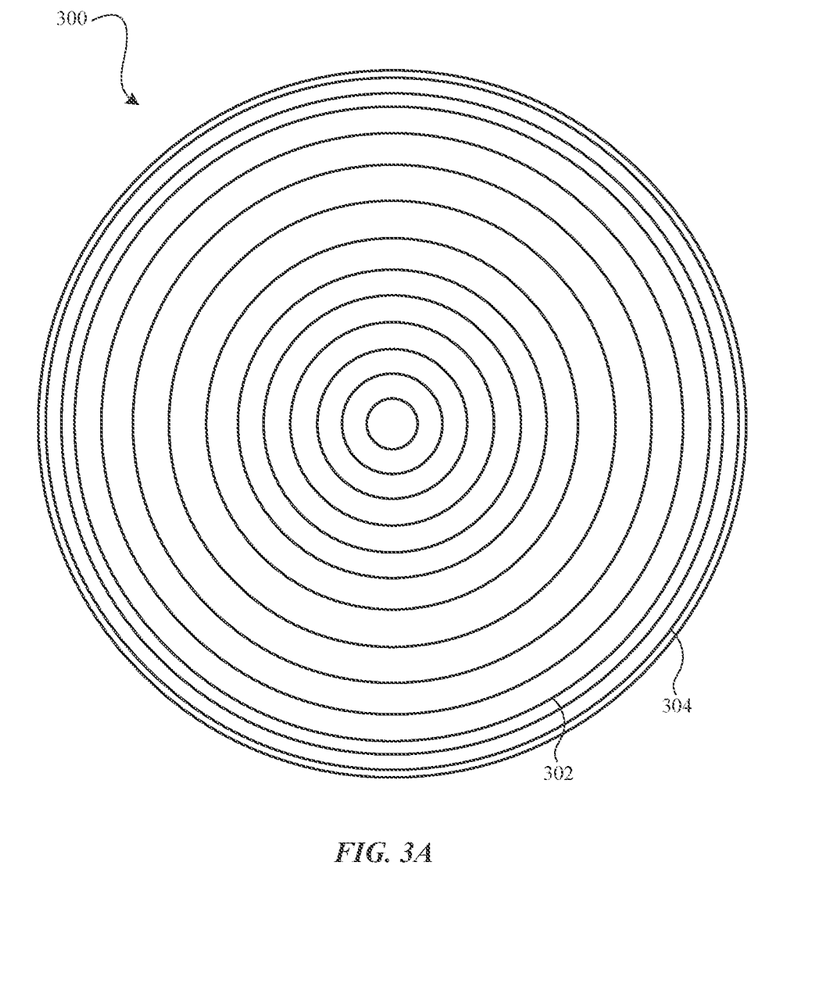
FIG. 3A illustrates a top view of a Fresnel lens including a first set of grooves that are concentric with a circumference of a surface of the lens and a second set of grooves that form a barrier ring along the circumference, according to embodiments of the disclosure.
Figure 3B:
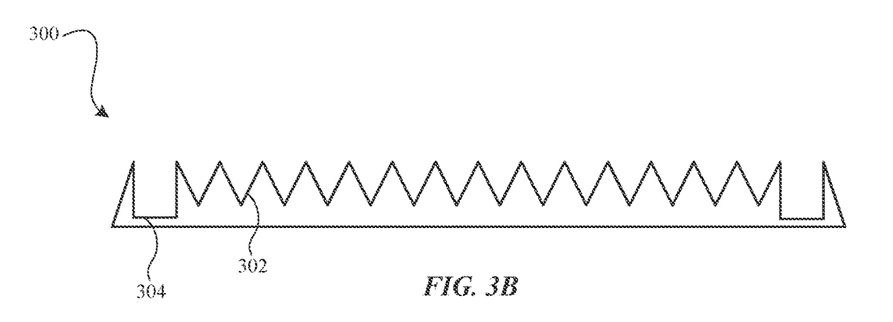
FIG. 3B illustrates a side view of a Fresnel lens including a first set of grooves that are concentric with a circumference of a surface of the lens and a second set of grooves that form a barrier ring along the circumference, according to embodiments of the disclosure.
Figure 3C:
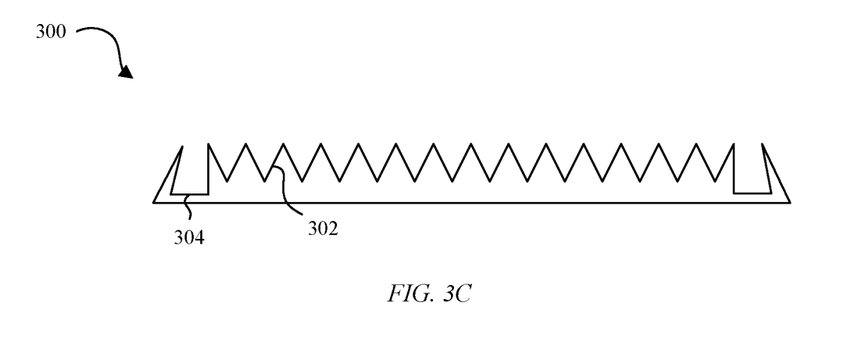
FIG. 3C illustrates a side view of a Fresnel lens including a first set of grooves that are concentric with a circumference of a surface of the lens and a second set of grooves that form a barrier ring along the circumference, according to embodiments of the disclosure.

FIGS. 3A and 3B illustrate a Fresnel lens 300 including a first set of one or more grooves (including first groove 302) that are concentric with a circumference of a surface of the lens and a second set of one or more grooves (including second groove 304) that form a barrier ring along the circumference. In some examples, the second set of grooves define an annular portion of the surface surrounding the first set of grooves. As illustrated in FIG. 3B, the first groove 302 has a first cross-sectional shape different from a second cross-sectional shape of the second groove 304.

In some examples, the shape of the first set of grooves is configured to optimally refract light (e.g., to collimate light as in a Fresnel lens), and the shape of the second set of grooves is configured to optimally catch excess liquid adhesive. For example, in FIG. 3B, the first groove 302 is tapered such that it narrows to a v-shaped corner at its deepest portion, whereas the second groove 304 includes a flat surface at its deepest portion. The flat surface at the bottom of the second groove 304 is configured to catch a larger amount of liquid adhesive than the sharp corner at the bottom of the first groove 302. Additionally, the second groove 304 can be deeper than the first groove 302 and/or wider than the first groove, and a volume of a cavity formed by the second groove can be greater than a volume of a cavity formed by the first groove. In some examples, the first groove 302 has no more than two sides, and the two sides of the first groove meet at its deepest portion, whereas the second groove 304 has more than two sides, including a flat surface at its deepest portion. In some examples, the second groove 304 is narrower at the surface than it is at a portion deeper than the surface portion (e.g., the width of the second groove expands to catch more liquid adhesive).

Figure 4:
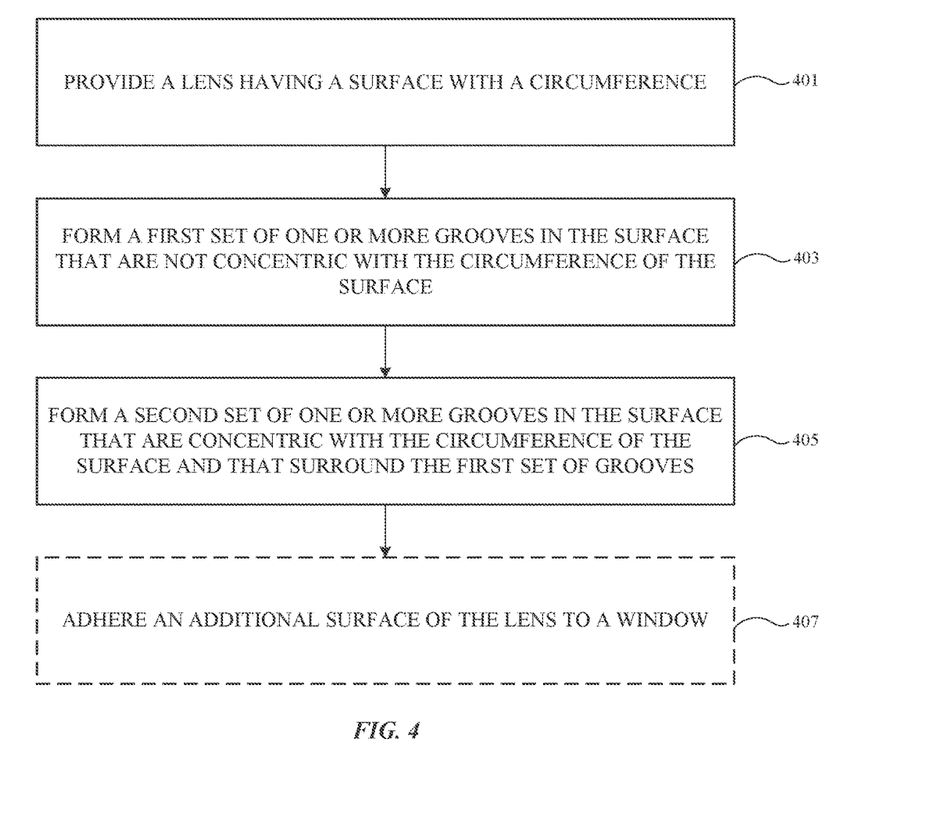
FIG. 4 is a block diagram of a method of forming a lens, according to examples of the disclosure.

FIG. 4 is a block diagram of a method of forming a lens according to examples of the disclosure. A lens having a surface with a circumference can be provided (401). A first set of one or more grooves can be formed (403) in the surface, wherein the grooves of the first set are not concentric with the circumference of the surface. A second set of one or more grooves can be formed (405) in the surface, wherein the grooves of the second set are concentric with the circumference of the surface, and the grooves of the second set surround the first set of grooves.

In some examples, the lens can include an additional surface opposite the surface that includes the first and second sets of grooves, and the method can further include adhering (407) the additional surface of the lens to a window (e.g., as illustrated in FIG. 1B). In some examples, the lens can be adhered via a liquid adhesive, and, after adhering, the liquid adhesive may be present in at least an outermost groove of the second set of grooves.

In some examples, the method illustrated in FIG. 4 can be performed in any order and some of the steps can overlap. For example, forming the first and second sets of grooves can occur concurrently.

Examples of the disclosure can be advantageous in providing a Fresnel lens with barrier rings that prevent LOCA from entering inner grooves of the lens, thereby preventing visual artifacts in the Fresnel lens.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A lens having a surface with a circumference, the lens comprising:
   a first set of one or more semi-circular grooves in the surface that are not concentric with the circumference of the surface; and
   a second set of one or more grooves in the surface that are concentric with the circumference of the surface and that surround the first set of grooves, wherein an end of at least one groove of the first set of grooves intersects with at least one groove of the second set of grooves.

2. The lens of claim 1, wherein the lens is adhered, on an additional surface of the lens opposite the surface that includes the first and second sets of grooves, to a window.

3. The lens of claim 1, wherein the first set includes a first groove having a first cross-sectional shape, and the second set includes a second groove having a second cross-sectional shape different from the first cross-sectional shape.

4. The lens of claim 2, wherein the lens is adhered via a liquid adhesive, and the liquid adhesive is present in at least an outermost groove of the second set of grooves.

5. The lens of claim 3, wherein the first groove is tapered such that it narrows to a v-shaped corner at a deepest portion of the first groove and the second groove includes a flat surface at a deepest portion of the second groove.

6. The lens of claim 3, wherein the second groove is narrower at a surface portion of the second groove than at a portion of the second groove that is deeper than the surface portion.

7. The lens of claim 3, wherein the second groove is deeper than the first groove.

8. The lens of claim 3, wherein the second groove is wider than the first groove.

9. The lens of claim 3, wherein a volume of a cavity formed by the second groove is greater than a volume of a cavity formed by the first groove.

10. The lens of claim 3, wherein the first groove includes two sides that meet at a deepest portion of the first groove, the first groove includes no more than two sides, and the second groove includes more than two sides, including a flat surface at a deepest portion of the second groove.

11. A lens having a surface with a circumference, the lens comprising:
   a first set of one or more semi-circular grooves in the surface that are not concentric with the circumference of the surface; and
   a second set of one or more grooves in the surface that define an annular portion of the surface surrounding the first set of grooves, wherein an end of at least one groove of the first set of grooves intersects with at least one groove of the second set of grooves,
   wherein the grooves of the second set spiral inwards, forming a barrier ring surrounding the first set of grooves.

12. The lens of claim 11, wherein the grooves of the second set are offset with respect to the circumference of the surface such that the grooves of the second set are non-concentric with the circumference, forming form a barrier ring surrounding the first set of grooves.

13. The lens of claim 11, wherein the grooves of the second set form a non-circular path along the annular portion of the surface surrounding the first set of grooves.

14. The lens of claim 11, wherein the first set includes a first groove having a first cross-sectional shape, and the second set includes a second groove having a second cross-sectional shape different from the first cross-sectional shape.

15. The lens of claim 11, wherein the lens is adhered, on an additional surface of the lens opposite the surface that includes the first and second sets of grooves, to a window.

16. The lens of claim 15, wherein the lens is adhered via a liquid adhesive, and the liquid adhesive is present in at least an outermost groove of the second set of grooves.

* * * * *